United States Patent
Lelowicz et al.

(10) Patent No.: US 12,456,311 B2
(45) Date of Patent: Oct. 28, 2025

(54) METHOD FOR DETERMINING A CURRENT STATUS OF A WINDOW

(71) Applicant: Aptiv Technologies AG, Schaffhausen (CH)

(72) Inventors: Kamil Lelowicz, Bogunice (PL); Pawel Markiewicz, Cracow (PL)

(73) Assignee: APTIV TECHNOLOGIES AG, Schaffhausen (CH)

(*) Notice: Subject to any disclaimer, the term of this patent is extended or adjusted under 35 U.S.C. 154(b) by 137 days.

(21) Appl. No.: 18/334,609

(22) Filed: Jun. 14, 2023

(65) Prior Publication Data
US 2024/0005675 A1 Jan. 4, 2024

(30) Foreign Application Priority Data
Jun. 30, 2022 (EP) .................................... 22182321

(51) Int. Cl.
*G06V 20/59* (2022.01)
*B60J 1/20* (2006.01)

(52) U.S. Cl.
CPC .............. *G06V 20/59* (2022.01); *B60J 1/20* (2013.01)

(58) Field of Classification Search
CPC .... G06V 20/59; G06V 10/143; G06V 10/147; G06V 10/44; G06V 10/82; G06V 10/25; G06V 10/75; G06V 10/766; G06V 20/56; B60J 1/20; G06T 2207/20081; G06T 7/0004; G06T 2207/10024; G06T 2207/10048; G06T 2207/20084; B60R 16/0232; G01B 11/00; G01N 21/8851; G01N 21/958; G01N 2021/8887; G06N 20/00

USPC ........................................................... 348/148
See application file for complete search history.

(56) References Cited

U.S. PATENT DOCUMENTS

| 3,971,065 A | 7/1976 | Bayer |
| 11,763,478 B1* | 9/2023 | Yang ......................... G06T 7/62 |
| 2005/0074142 A1* | 4/2005 | Ertl ................... B60R 21/01538 |
| | | 382/104 |
| 2012/0026318 A1* | 2/2012 | Huelsen ............... B60S 1/0844 |
| | | 348/135 |
| 2018/0187472 A1* | 7/2018 | Ikeda ...................... E05F 15/73 |

(Continued)

FOREIGN PATENT DOCUMENTS

| EP | 2207700 | 3/2011 |
| JP | 2007186915 | 7/2007 |

OTHER PUBLICATIONS

"Extended European Search Report", EP Application No. 22182321.4, Jan. 31, 2023, 9 pages.

(Continued)

*Primary Examiner* — Thai Q Tran
*Assistant Examiner* — Stephen R Smith
(74) *Attorney, Agent, or Firm* — Harness, Dickey & Pierce, P.L.C.

(57) ABSTRACT

A method is provided for determining a current status of a window of a vehicle. The vehicle comprises an optical sensor system configured to acquire at least one image of an interior of a vehicle cabin, wherein at least a part of the window is visible in the at least one image. According to the method, at least one characteristic of a pane of the window is determined from the at least one image, and the current status of the window is determined based on the at least one characteristic of the pane.

14 Claims, 5 Drawing Sheets

(56) References Cited

U.S. PATENT DOCUMENTS

2020/0387723 A1    12/2020  Mazuir et al.
2022/0101507 A1*   3/2022   Tournier ............... G06Q 50/163
2023/0057766 A1*   2/2023   Salter ..................... G06V 20/59
2023/0384116 A1*   11/2023  Beaurepaire ....... G01C 21/3878

OTHER PUBLICATIONS

Bochkovskiy, et al., "YOLOv4: Optimal Speed and Accuracy of Object Detection", Apr. 23, 2020, 17 pages.
Niklaus, et al., "3D Ken Burns Effect from a Single Image", Sep. 12, 2019, 15 pages.
Wang, et al., "FCOS3D: Fully Convolutional One-Stage Monocular 3D Object Detection", Sep. 24, 2021, 10 pages.
Yan, et al., "Windows Open Status Detection for Boxcar in Railway Transportation Based on Computer Vision", Dec. 2, 2017, pp. 91-94.

* cited by examiner

METHOD FOR DETERMINING A CURRENT STATUS OF A WINDOW

INCORPORATION BY REFERENCE

This application claims priority to European Patent Application No. EP22182321.4, filed Jun. 30, 2022, the disclosure of which is incorporated by reference in its entirety.

BACKGROUND

In modern vehicles, a current position of a side window is usually determined by Hall sensors. Alternatively, attempts have been made to use so-called ripple count algorithms which estimate the number of revolutions for an engine moving the window. The number of revolutions can be transformed to a change in the position of the side window. However, such algorithms require a calibration every couple of cycles in order to determine whether the side window is in a fully open state or in a closed state.

In summary, the existing approaches for determining the position of the side window either require additional hardware components like Hall sensors or an extensive calibration effort. In addition, the existing approaches do not provide information regarding the condition of a window pane, e.g., whether it is damaged or whether an object or an obstacle is present between the pane and a window frame and therefore violates a predefined work area of the pane.

Accordingly, there is a need to provide a method for determining a current status of a window requiring a low effort regarding hardware and calibration.

SUMMARY

The present disclosure provides computer implemented methods, computer systems, and a non-transitory computer readable mediums, including those described in the claims. Embodiments are given in the claims, the description, and the drawings.

In one aspect, the present disclosure is directed at a computer implemented method for determining a current status of a window of a vehicle. The vehicle comprises an optical sensor system configured to acquire at least one image of an interior of a vehicle cabin, wherein at least a part of the window is visible in the at least one image. According to the method, at least one characteristic of a pane of the window is determined from the at least one image via a processing unit, and the current status of the window is determined based on the at least one characteristic of the pane via the processing unit.

The window may be a side window of the vehicle. In this case, one or more side windows of the vehicle have to be visible in the at least one image acquired by the optical sensor system. In other words, one or more side windows may be located in a field of view associated with the optical sensor. Furthermore, the optical sensor system may include at least one multi-purpose interior camera of the vehicle. Moreover, such a camera may be configured to capture images in the visible range of the spectrum (RGB images for human vision) and/or in the infrared range of the spectrum (IR images for computer vision).

The current status of the window may refer to different aspects concurrently, e.g., including an opening degree of the window determined by a position of the pane relative to a frame of the window, a condition of the pane per se (e.g., whether it is intact or damaged), and/or a violation of a predefined work area of the pane by an obstacle. The current status of the window may therefore be regarded as a status vector whose components are associated with a certain state or condition of the window. In detail, such components may include the opening state or degree of the window, and/or a binary flag for an intact or damaged pane or for a violation of the predefined work area of the pane, respectively. Hence, the method according to the disclosure may not only provide information regarding the opening degree of the window, like methods according to the related art, but also information regarding the condition of the pane.

Similarly, the at least one characteristic of the pane may refer to a spatial location of the pane with respect to the frame of the window and/or to properties of the pane itself. For example, a spatial position of an edge of the pane may be derived from the image captured by the optical sensor system. During installation of the optical sensor system in the vehicle, the system may be calibrated with respect to predefined reference points in the interior of the vehicle. As such, the optical sensor system may also be calibrated with respect to a top, a bottom and/or edges of the window frame, for example. Therefore, based on such a calibration of the optical sensor system, monitoring an edge of the pane may provide the required information regarding an opening degree of the window.

As an additional characteristic of the pane, predefined traces or patterns of damages may be detected in the image provided by the optical sensor system. The predefined traces or patterns may be used as an indicator for a damage of the window pane, and the current status of the pane may be determined based on this indicator.

In a similar manner, a further characteristic may refer to the presence of a foreign object (e.g., an obstacle or another object), within a predefined work space of the pane, e.g., in a free space belonging to the predefined work space and being located between an upper edge of the pane and the window frame. Based on this characteristic, it may be determined whether the predefined work space is violated.

One advantage of the method according to the disclosure is that no special hardware components like Hall sensors are required in order to determine the current status of the window, e.g., whether the window is currently open or closed. In future, interior cameras may be mandatory for vehicles due to government regulations, and interior cameras are installed in many modern vehicles already. As such, the optical sensor system in the form of an interior camera may be regarded as being available in the vehicle without the need of further hardware installations for performing the method. In other words, the method does therefore not require dedicated hardware components which have to be used for performing the method only.

Moreover, the method according to the disclosure requires a low calibration effort since in many vehicles the interior optical sensor system may already be calibrated with respect to certain reference points. Due to this, the optical sensor system may also be calibrated respect to one or more window frames which are visible in the images provided by the optical sensor system. Hence, the calibration effort is reduced (e.g., in comparison to ripple count algorithms estimating the number of revolutions for an engine driving the window pane). In addition, the method may provide a high reliability since it relies on the interior optical sensor system of the vehicle only, wherein a standard calibration of the optical sensor system may be required if certain characteristics of the window pane are selected for determining the current status of the window.

According to an embodiment, the operation of determining the at least one characteristic of the pane may comprise monitoring at least a predefined portion of an upper edge of the pane with respect to a frame of the window. The predefined portion may be selected in such a manner that it may be clearly recognized in the image provided by the optical sensor system. If a spatial position of the upper edge of the pane is known with respect to the window frame, the current status regarding the opening of the window may be derived from this spatial position.

Monitoring at least the predefined portion of an upper edge of the pane may comprise determining a position of the predefined portion of the upper edge of the pane relative to a position of an upper part and/or a lower part of the frame. The position of the pane may be calibrated with respect to the frame of the window. Based on the relationship between the position of the upper edge of the pane and the upper part and/or the lower part of the frame, an opening degree of the window may be derived, e.g., as a percentage.

Moreover, a first straight line may be adapted to the predefined portion of upper edge of the pane, and a second straight line may be adapted to the upper part and/or to the lower part of the frame. The position of the upper edge of the pane may be determined with respect to the upper part and/or the lower part of the frame based on a respective offset and a respective slope of the first and second straight lines. The straight lines may be fitted to the upper edge of the window pane and to the upper part and/or the lower part of the frame identified in the image provided by the optical sensor system. The slope and the offset of the straight lines may be a respective pair of parameters of such a fitting process.

If the optical sensor system and therefore the images captured by the optical sensor system are calibrated with respect to predefined reference points within the vehicle, the spatial location of the window pane may be derived with low effort from the image if the respective parameters of the straight lines are known. For this embodiment, determining the current status of the window regarding opening may reduce to the task of comparing the respective two parameters of the straight line representing the upper edge of the pane and the upper and/or the lower part of the frame of the window.

According to a further embodiment, the current status may be indicative of a closed state, a partly open state or a fully open state of the window. The partly open state of the window may refer to a position of the pane between the closed state and the fully open state of the window. Since the current status may include these three options only for this embodiment, the processing unit may determine the current status of the window with low computational effort by selecting one of the three options.

The current status of the window may further be indicative of an opening degree of the window. The opening degree may be provided as a percentage. For this embodiment, the method does not only provide the current status as an open or closed state and/or an arbitrary position of the pane therebetween, but alternatively or additionally detailed information about the opening area of the window. This information may be relevant for further automotive applications. For example, a percentage of opening may be determined from the position of the upper edge of the pane relative to the lower or upper part of the frame. If the respective edges of the pane and the frame are represented by respective straight lines including two parameters (e.g., a respective slope and a respective offset), the percentage of opening may be derived from comparing the respective parameters.

According to a further embodiment, the at least one characteristic of the pane of the window may include a damage indicator which may be determined based on the at least one image, and the current status of the window may further include a damage degree of the window which is determined based on the damage indicator. The damage indicator may include a predefined trace or pattern which is associated with a damage of the window, e.g., a partly broken pane. Such a trace or pattern may be recognized in the image provided by the optical sensor system by analyzing the image via the processing unit. For this embodiment, the current status of the window may not only include information regarding the opening degree, but also information regarding e.g., an intact or damaged pane. This additional information may be provided by a binary variable indicating whether the pane is broken or not. Moreover, the damage degree may be provided as a percentage.

If the damage degree exceeds e.g., a predefined threshold, a warning may be provided e.g., on a display of the vehicle indicating that the window needs to be repaired. In addition, a further movement of the pane may be prevented if the currents status includes a damage of the pane.

According to a further embodiment, a free space between an upper edge of the pane and an upper part of a frame of the window may be monitored regarding a presence of a foreign object. The free space may be a part of a predefined work area of the pane. The at least one characteristic may include the presence of the foreign object in the predefined work area, and the current status of the window may further include a flag for a violation of the predefined work area. The flag may be set if the foreign object is present in the predefined work area. Accordingly, the flag may not be set if no violation can be detected. The foreign object may be any object different from the pane of the window, e.g., a hand or a finger of a vehicle occupant. For this embodiment, the current status may be transferred to other automotive systems within the vehicle (e.g., to an anti-pinch system), in order to prevent the foreign object from being clamped between the pane and the frame of the window. Hence, the safety features of the vehicle may be supported by information provided by the method of the disclosure.

According to a further embodiment, determining the current status of the window based on the at least one characteristic of the pane may include applying a machine learning algorithm to the at least one image. The machine learning algorithm may include a neural network which may perform a computer vision task based on the at least one image provided by the optical sensor system. For example, a respective neural network for object detection, depth estimation and/or object position and orientation estimation may be applied.

For example, an actual position of e.g., the upper edge of the window pane and of the upper edge of the window frame may be provided as ground truth for the machine learning algorithm. Based on such a ground truth, the machine learning algorithm may be trained to recognize certain portions of the window pane and the window frame, e.g., their upper edges. Based on such a recognition, a regression may be performed by the machine learning algorithm in order to determine e.g., the spatial location of straight lines passing through the respective edges. The result of such a regression may be the respective two parameters defining the respective straight line. The machine learning algorithm may further be able to provide an opening degree of the window based on such a regression.

For determining a damage degree of the window, a similar recognition may be performed by the machine learning algorithm. However, a binary regression may be performed only regarding the damage degree which results in the information whether the window is damaged or not. If such a binary regression provides a damaged status of the window, the machine learning algorithm may suppress the output of results regarding the window position, e.g., the opening degree, and may provide information to other automotive systems of the vehicle for preventing a further movement of the pane.

If the current status of the window additionally includes the flag for the violation of the predefined work area, the machine learning algorithm may include a depth detection and an object detection in order to recognize the spatial location of a foreign object in three dimensions. Based on the object and depth detections, the violation of the predefined work area may be determined by using calibration data defining the predefined work area of the window.

The optical sensor system may be configured to capture an image in the visible spectral range and in an infrared range, and the current status of the window may be determined by applying the machine learning algorithm to the image in the visible spectral range and to the infrared image. The visible spectral range refers to light being visible for the human eye, e.g., to an RGB image. If the machine learning algorithm is applied to both of the RGB image and the infrared image, the method may be performed independently from the specific illumination level within the interior of the vehicle. That is, the current status of the window may also be determined by the method during the night.

The current status of the window may be transferred to at least one further vehicle system, e.g., to an advanced driver assistance system of the vehicle, and/or to a display being visible for a driver of the vehicle in order to issue a warning message and/or to initiate a safety measure based on the current status of the window. For example, the driver may be informed about the current opening degree of the vehicle's side windows. Hence, an unexpected opening of the side windows may be recognized by the driver, and he will be able to counteract any danger entailed by such an unexpected opening. If the current status is indicative of a damage of the window pane, the driver may also be informed accordingly, and opening the respective window may be prevented. Moreover, if current status is indicative of a foreign object within the workspace of the window pane, further closing the window may be prevented, e.g., by an anti-pinch system.

In another aspect, the present disclosure is directed at a computer system, said computer system being configured to carry out several or all operations of the computer implemented method described herein.

The computer system may comprise a processing unit, at least one memory unit and at least one non-transitory data storage. The non-transitory data storage and/or the memory unit may comprise a computer program for instructing the computer to perform several or all operations or aspects of the computer implemented method described herein.

As used herein, the term processing unit may refer to, be part of, or include an Application Specific Integrated Circuit (ASIC), an electronic circuit, a combinational logic circuit, a field programmable gate array (FPGA), a processor (shared, dedicated, or group) that executes code, other suitable components that provide the described functionality, or a combination of some or all of the above, such as in a system-on-chip. The processing unit may include memory (shared, dedicated, or group) that stores code executed by the processor.

In another aspect, the present disclosure is directed at a vehicle which includes the computer system as described above and an optical sensor system. The computer system is therefore configured to carry out the computer implemented method, as it is also described above. Hence, the benefits, the advantages and the disclosure for the computer implemented method are also valid for the vehicle according to the disclosure. The optical sensor system is configured to acquire at least one image of the interior of a vehicle cabin. At least a part of a window of the vehicle is visible in the at least one image.

According to an embodiment, the computer system includes a machine learning algorithm configured to be applied to the at least one image provided by the optical sensor system. The machine learning algorithm may include a core neural network and a respective output head for an opening degree of the window, a damage degree of the window and/or a flag for a violation of a predefined work area of a pane of the window.

The current status of the window may therefore be provided by one or more output heads of the machine learning algorithm which use a common core neural network. In addition to the opening degree which may also be provided by methods and systems according to the related art, the machine learning algorithm of the computer system according to the disclosure may provide additional information regarding the current status of the window, e.g., regarding damage and/or regarding violation of the predefined work area.

Moreover, the optical sensor system may be configured to capture an image in the visible spectral range and an infrared image. As mentioned above, the optical sensor system according to this embodiment may allow to perform the method according to the disclosure independently from the current illumination within the vehicle and even at night.

In another aspect, the present disclosure is directed at a non-transitory computer readable medium comprising instructions for carrying out several or all operations or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM); a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all operations or aspects of the computer implemented method described herein.

BRIEF DESCRIPTION OF THE DRAWINGS

Exemplary embodiments and functions of the present disclosure are described herein in conjunction with the following drawings, showing schematically.

DETAILED DESCRIPTION

The present disclosure relates to a method for determining a current status of a window of a vehicle.

Figure 1:
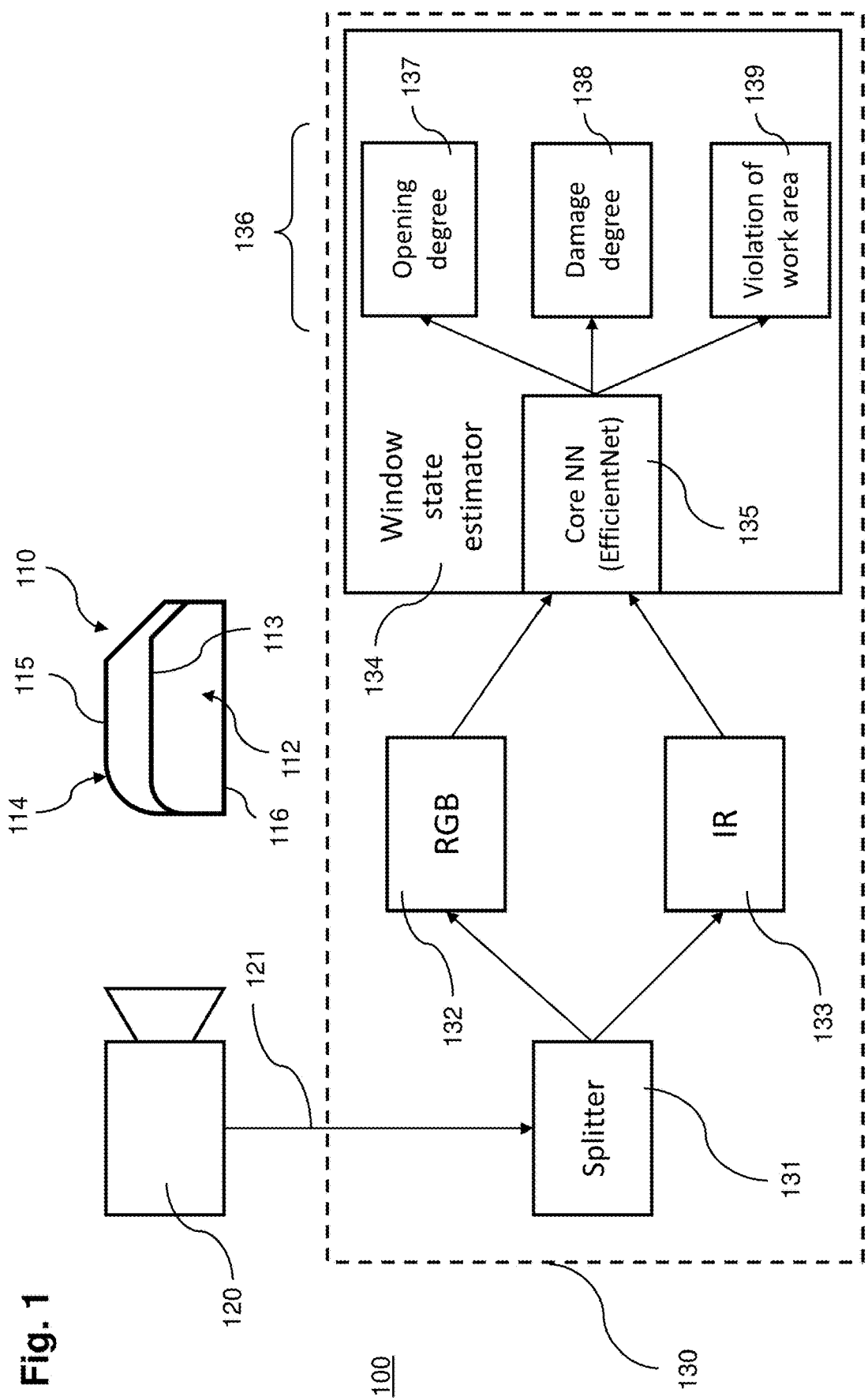
FIG. 1 is an illustration of a system for determining a current status of a window according to the disclosure.

FIG. 1 schematically depicts a system 100 which is configured to perform a computer implemented method for determining a current status of a window 110 being installed in a vehicle (not shown). The window 110 includes a pane 112 having an upper edge 113, and a frame 114 which includes an upper part 115 and a lower part 116.

Figure 2:
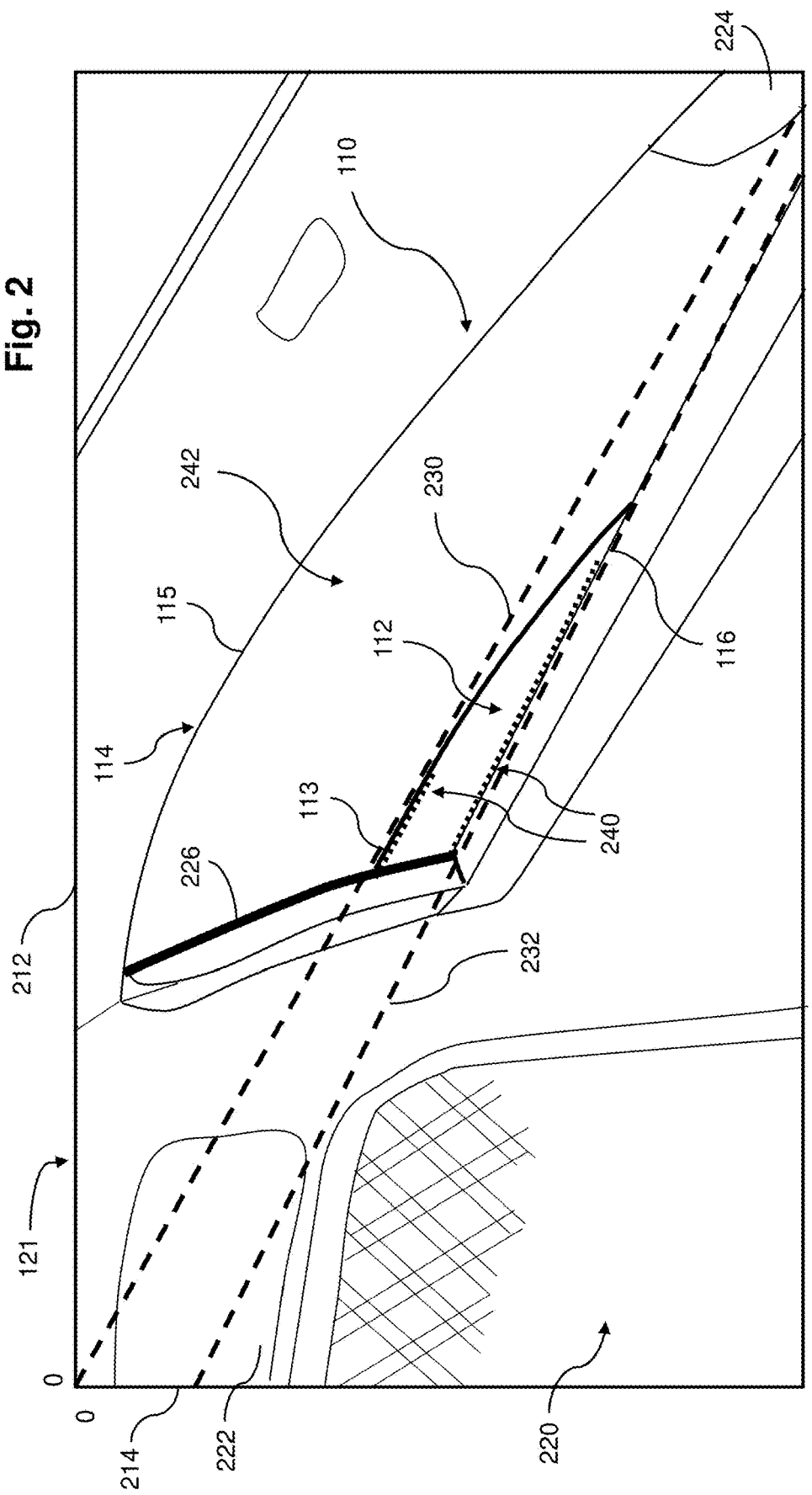
FIG. 2 is a detailed illustration of a vehicle window for which the current status is determined.

The system 100 includes an optical sensor system 120 implemented as a camera which is configured to acquire at least one image 121 of the interior of the vehicle. For sake of simplicity, the image 121 is just depicted as an output of the camera 120 in FIG. 1. An example for the image 121 is shown in FIG. 2. The at least one image 121 is provided for monitoring the window 110. Therefore, the image 121 covers at least a part of a spatial region in which the window is installed, e.g., including the upper part 115, the lower part 116 and side parts of the frame 114.

The system 100 further includes a processing unit 130 which is communicatively coupled to the camera 120. The camera 120 is configured as an RGB-IR multipurpose interior camera which is typically installed in many modern vehicles. That is, the camera 120 is able to provide the image 121 as a raw RGB-IR image including information in the visible or RGB range of the spectrum as well as in the infrared range (IR range). The processing unit 130 includes a splitter 131 which is configured to split the raw RGB-IR image 121 into an RGB image 132 and an infrared image 133. In other words, the splitter 131 splits the raw image 121 into an IR stream 133 and an RGB stream 132. The camera 120 captures the IR stream 133 by applying a short exposure time with active illumination of the interior of the vehicle. In contrast, the camera 120 captures the RGB stream 132 by applying a long exposure time without active illumination.

The RGB stream 132 is further preprocessed by the processing unit 130 to obtain an RGB Bayer pattern known in the art in order to provide an image having three channels, e.g., one respective channel for red, green and blue. The advantage for providing an RGB stream 132 and an IR stream 133 for determining the status of the window 110 is that the method according to the disclosure is independent of the actual illumination in the interior of the vehicle. Hence, the method may also be performed at night.

The RGB image 132 and the IR image 133 provide a respective input for a window state estimator 134 which is part of the processing unit 130. The window state estimator 134 is based on a machine learning algorithm which includes a common core neural network 135. The core neural network 135 may be based on EfficientNet which is known in the art. The window state estimator 134 further includes respective output heads 136 which are associated with a respective component of the current status of the window 110. In detail, the window state estimator 134 includes an output head 137 for an opening degree of the window 110, an output head 138 for a damage degree of the window 110, and an output head 139 for a violation of a predefined work area of the pane 112 of the window 110. Details for determining the current status of the window 110 by performing the method according to the disclosure are described in the following in context of FIG. 2.

FIG. 2 schematically depicts an image 121 as captured by the camera 120 (see FIG. 1). The camera 120 is calibrated with respect to reference points within the interior of the vehicle. Therefore, the image 121 includes an x-axis 212 and a y-axis 214 which are scaled with respect to a predefined origin of a coordinate system. The origin is indicated in the upper left corner of the picture 121 by a respective zero belonging to the x-axis 212 and the y-axis 214.

The image 121 includes the window 110 which is a side window of the vehicle. The window 110 includes the window pane 112 with the upper edge 113 and the frame 114 with the upper part 115 and the lower part 116. As can be recognized from the position of the upper edge 113 of the window pane 112, the window 110 is in a partly open state between a fully open state and a fully closed state of the window 110.

For illustrational purposes, further components of the vehicle are shown in FIG. 2, e.g., a driver seat 220 including a head rest 222, and an exterior mirror 224. Moreover, a guiding rail 226 of the window 110 is shown which is provided for guiding the pane 112 between the fully open and the fully closed states of the window 110.

The machine learning algorithm of the window state estimator 134 (see FIG. 1) can be trained to recognize the pane 112 of the window 110 within the image 121 in order to determine the current status of the window 110 regarding the opening degree, the damage degree and the violation of the work area. In detail, the machine learning algorithm can be trained to determine the transparency of the pane 112 and/or the position of the upper edge 113 of the pane 112 with respect to the lower part 116 and/or the upper part 115 of the window frame 114.

For example, a ground truth regarding transparency of the pane 112 can be provided to the machine learning algorithm in order to distinguish a fully open state of the window 110 from a partly open and a fully closed state as well as from a damaged state of the window 110. In addition, the visibility and/or the position of the upper edge 113 of the pane 112 can be considered in order to distinguish between the fully open, partly open and fully closed states of the window 110.

The output head 137 for the opening degree (see FIG. 1) is trained in such a manner that one of these states is provided as an output. Similarly, the output head 138 for the damage degree can be trained based on ground truth regarding transparency of the window pane 112 in order to output e.g., a binary flag indicating whether the pane 112 is damaged or not.

In addition to these discrete states associated with the window 110, additional information can be provided by the output heads 137, 138 regarding the opening degree and the damage degree of the window 110. The opening degree and the damage degree are defined as a percentage, wherein 0% indicates a fully closed pane 112 of the window 110 (output head 137) and a completely intact or not damaged window (output head 138), respectively, whereas 100% indicates a fully open window 110 (output head 137) and an entirely damaged window pane 112 (output head 138), respectively.

For determining the opening degree as percentage, a first straight line 230 (see FIG. 2) is adapted to the upper edge 113 of the pane 121 such that the first straight line 230 passes through a predefined portion of the upper edge 113. As a result, the machine learning algorithm provides two parameters of the first straight line 230, e.g., the slope and the offset with respect to the coordinate system of the image 121. In a similar manner, a second straight line 232 is adapted to the lower part or edge 116 of the frame 114 of the window 110. The first and second straight lines 230, 232 which are to be adapted to the edges 113, 116, respectively, are shown as dashed lines in FIG. 2.

The adaptation or fitting of the first and second straight lines 230, 232 to the respective edges 113, 116 is performed by a regression task of the machine learning algorithm of the window state estimator 134. For the training of this regression task, a ground truth 240 is applied which indicates the actual position of a respective portion of the upper edge 113 of the pane 112 and of the lower part or edge 116 of the frame 114, respectively. The ground truth 240 is illustrated in FIG. 2 by dotted lines extending over the respective portions of the edges 113, 116.

As a result of this fitting procedure, the position of the upper edge 113 of the pane 112 is known with respect to the lower part or edge 116 of the frame 114 in terms of the respective two parameters, e.g., the slope and the offset, of the straight lines 230, 232. Based on the calibration of the camera 120 with respect to the interior of the vehicle and based on the known geometry of the window pane 112 and of the window frame 114, the degree of opening can be calculated as the percentage described above.

In a similar manner, traces or patterns can be provided as ground truth for cracks or other damages of the pane 112. Such traces or patterns may be used for recognizing actual cracks or other damages within the pane 112. Based e.g., on an area occupied by such damage indicators, the damage degree of the pane 112 can be determined via the machine learning algorithm and output by the output head 138 for the damage degree.

In addition, a certain work area is defined for the pane 112 when the window 110 performs the transition between the open and closed states. The work area refers to the movement of the pane 112 along the guiding rail 226 when transitioning from an open state to the fully closed state and vice versa. Based on the image 121, it can be additionally determined whether any foreign object or obstacle is currently located in the predefined path of the window pane 112, e.g., within a free space 242 between the upper edge 113 of the pane 112 and the upper part 115 of the frame 114, wherein the free space 242 is part of the work area being predefined for the movement of the pane 112.

The foreign object or obstacle violates the work area of the pane 112 and should not be clamped between e.g., the upper edge 113 of the pane 112 and the upper part 115 of the frame 114. In order to prevent such a clamping of an obstacle by the pane 112, the vehicle may be provided with an anti-pinch system which prevents the further winding up of the pane 112 in case that an obstacle is detected within the work area of the pane 112.

In order to detect a foreign object within the work area of the pane 112, the machine learning algorithm of the window state estimator 134 requires an object detection and a depth detection in order to decide whether the detected object or obstacle violates the predefined work space of the pane 112.

Accordingly, the output head 139 for the violation of the predefined work area outputs a flag which indicates whether the work area is violated, e.g., partly occupied by an obstacle, or not. If the work area is violated, the flag of the output head 139 is transferred to further controlling units of the vehicle, e.g., to the anti-pinch system, which prevents the further movement of the window pane 112 in order to suppress that the detected object or obstacle is clamped between the frame 114 and the pane 112. In a similar manner, a further movement of the window pane 112 can also be suppressed if the output head 138 for the damage degree indicates a damage of the window 110. In this case, the further movement of the pane 112 is prevented in order to avoid further damages of the window 110 and/or for safety reasons.

By performing the method according to the disclosure, the system 100 (see FIG. 1) outputs the current status of the window 110 in terms of the opening degree and in terms of further information regarding damage and the violation of the work area of the pane 112. Hence, the current status of the window 110 can be regarded as a vector including different components, each of which indicates a dimension of the current status like opening degree, damage degree and violation of work area.

Figure 3:
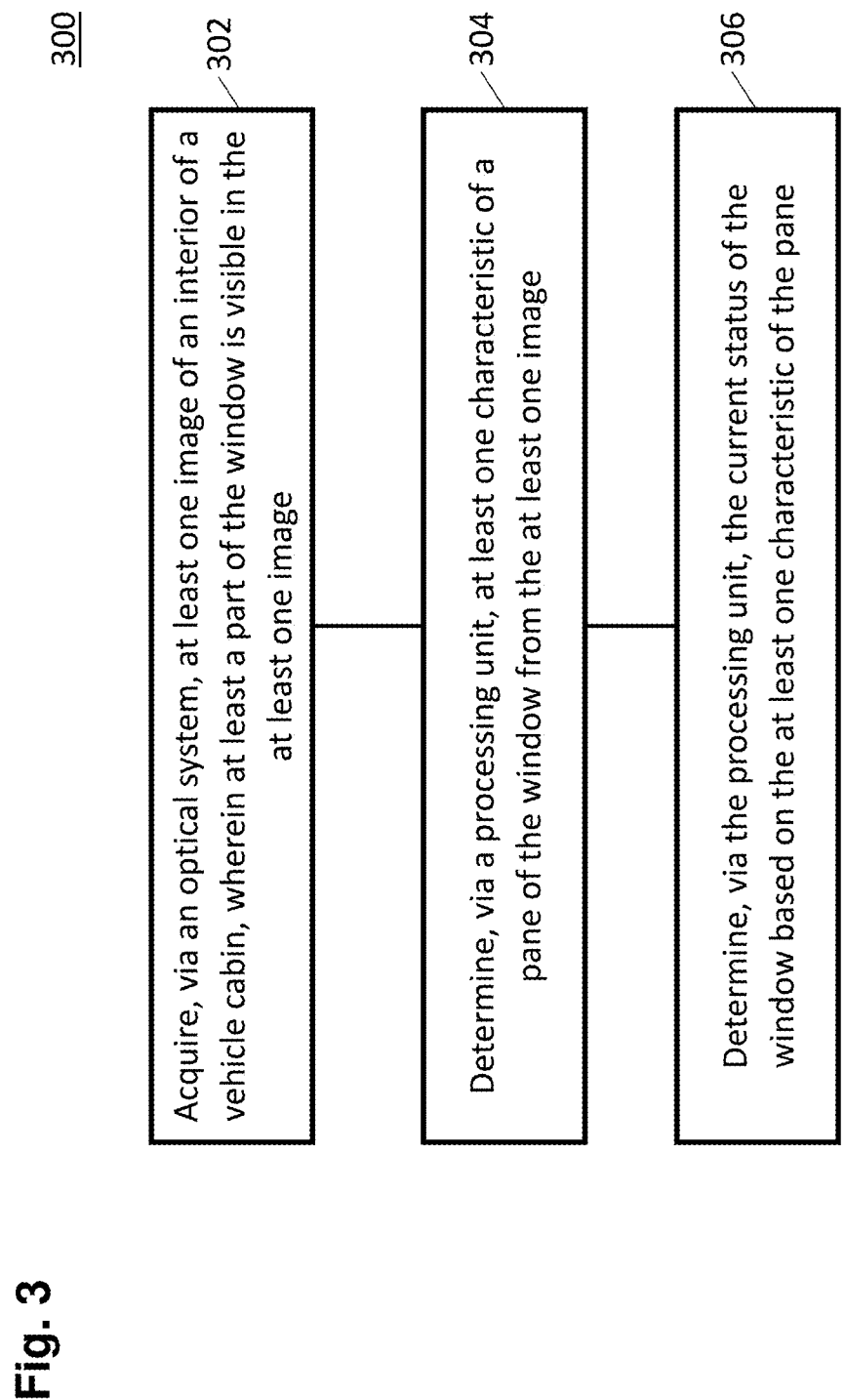
FIG. 3 is a flow diagram illustrating a method for determining a current status of a window of a vehicle according to various embodiments.

FIG. 3 shows a flow diagram 300 illustrating a method for determining a current status of a window of a vehicle according to various embodiments, wherein the vehicle comprises an optical sensor system. At 302, at least one image of an interior of a vehicle cabin is acquired by optical sensor system, wherein at least a part of the window is visible in the at least one image. At 304, at least one characteristic of a pane of the window is determined via a processing unit from the at least one image. At 306, the current status of the window is determined via the processing unit based on the at least one characteristic of the pane.

According to various embodiments, the operation of determining the at least one characteristic of the pane may comprise monitoring at least a predefined portion of an upper edge of the pane with respect to a frame of the window.

According to various embodiments, monitoring at least the predefined portion of the upper edge of the pane may comprise determining a position of the predefined portion of the upper edge of the pane relative to a position of an upper part and/or a lower part of the frame.

According to various embodiments, a first straight line may be adapted to the predefined portion of upper edge of the pane, and a second straight line may be adapted to the upper part and/or to the lower part of the frame. The position of the upper edge of the pane may be determined with respect to the upper part and/or the lower part of the frame based on a respective offset and a respective slope of the first and second straight lines.

According to various embodiments, the current status may be indicative of a closed state, a partly open state or a fully open state of the window.

According to various embodiments, the current status may be further indicative of an opening degree of the window.

According to various embodiments, the at least one characteristic of the pane of the window may further include a damage indicator which may be determined based on the at least one image, and the current status may further include a damage degree of the window which may be determined based on the damage indicator.

According to various embodiments, the damage indicator may include a predefined trace or a predefined pattern which is associated with a damage of the pane, and the image provided by the optical sensor system may be analyzed by the processing unit in order to recognize the predefined trace or predefined pattern.

According to various embodiments, a free space between an upper edge of the pane and an upper part of a frame of the window may be monitored regarding a presence of a foreign object. The free space may be a part of a predefined work area of the pane, the at least one characteristic may include the presence of the foreign object in the predefined work area, and the current status may further include a flag for a violation of the predefined work area. The flag may set if the foreign object is present in the predefined work area.

According to various embodiments, determining the current status of the window based on the characteristic of the pane may include applying a machine learning algorithm to the at least one image.

According to various embodiments, the optical sensor system may be configured to capture an image in the visible spectral range and an infrared image, and the current status of the window may be determined by applying the machine learning algorithm to the image in the visible spectral range and to the infrared image.

According to various embodiments, the current status of the window may be transferred to at least one further vehicle system and/or to a display being visible for a driver of the vehicle in order to issue a warning message and/or to initiate a safety measure based on the current status of the window.

Each of the operations 302, 304, and 306 and the further operations described above may be performed by computer hardware components.

Figure 4:
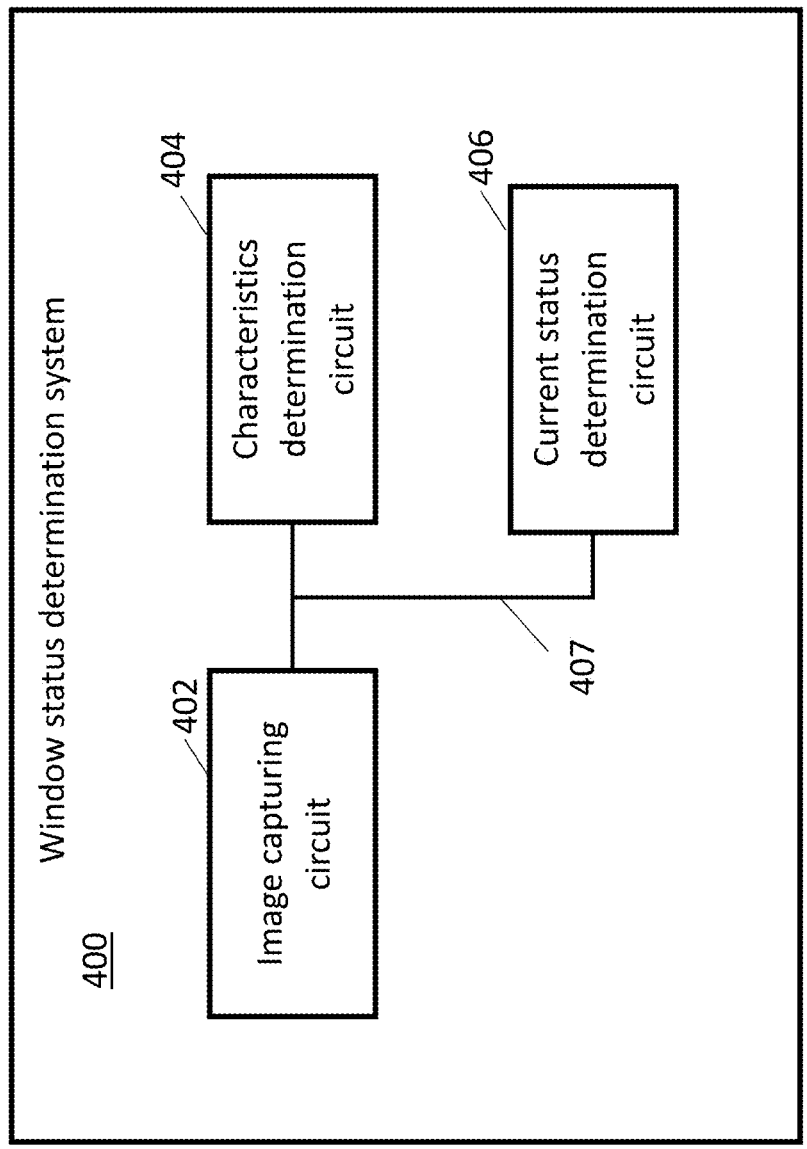
FIG. 4 illustrates a window status determination system according to various embodiments.

FIG. 4 shows a window status determination system 400 according to various embodiments. The window status determination system 400 may include an image capturing circuit 402, a characteristics determination circuit 404 and a current status determination circuit 406.

The image capturing circuit 402 may be configured to acquire, via an optical sensor system, at least one image of an interior of a vehicle cabin, wherein the at least one image covers at least a part of a spatial region in which the window is installed.

The characteristics determination circuit 404 may be configured to determine at least one characteristic of a pane of the window from the at least one image.

The current status determination circuit 406 may be configured to determine the current status of the window based on the at least one characteristic of the pane.

The image capturing circuit 402, the characteristics determination circuit 404 and the current status determination circuit 406 may be coupled to each other, e.g., via an electrical connection 407, such as e.g., a cable or a computer bus or via any other suitable electrical connection to exchange electrical signals.

A "circuit" may be understood as any kind of a logic implementing entity, which may be special purpose circuitry or a processor executing a program stored in a memory, firmware, or any combination thereof.

Figure 5:
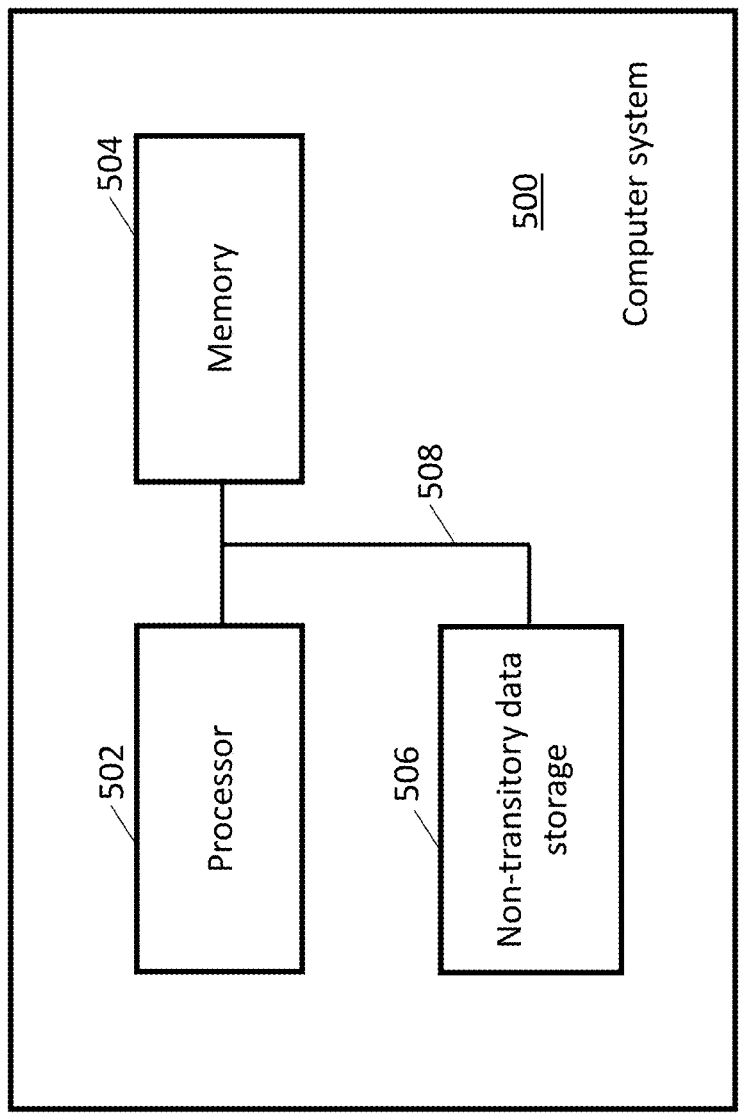
FIG. 5 illustrates a computer system including computer hardware components configured to carry out operations of a computer-implemented method for determining a current status of a window of a vehicle according to various embodiments.

FIG. 5 shows a computer system 500 with a plurality of computer hardware components configured to carry out operations of a computer implemented method for determining a current status of a window of a vehicle according to various embodiments. The computer system 500 may include a processor 502, a memory 504, and a non-transitory data storage 506.

The processor 502 may carry out instructions provided in the memory 504. The non-transitory data storage 506 may store a computer program, including the instructions that may be transferred to the memory 504 and then executed by the processor 502.

The processor 502, the memory 504, and the non-transitory data storage 506 may be coupled with each other, e.g., via an electrical connection 508, such as e.g., a cable or a computer bus or via any other suitable electrical connection to exchange electrical signals.

As such, the processor 502, the memory 504 and the non-transitory data storage 506 may represent the image capturing circuit 402, the characteristics determination circuit 404 and the current status determination circuit 406 as described above.

The terms "coupling" or "connection" are intended to include a direct "coupling" (for example via a physical link) or direct "connection" as well as an indirect "coupling" or indirect "connection" (for example via a logical link), respectively.

It will be understood that what has been described for one of the methods above may analogously hold true for the window status determination system 400 and/or for the computer system 500.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

List of Reference Characters for the Elements in the Drawings. The following is a list of the certain items in the drawings, in numerical order. Items not listed in the list may nonetheless be part of a given embodiment. For better legibility of the text, a given reference character may be recited near some, but not all, recitations of the referenced item in the text. The same reference number may be used with reference to different examples or different instances of a given item.

- 100 system for performing a method for determining a current status of a window
- 110 window
- 112 pane
- 113 upper edge of the pane
- 114 frame
- 115 upper part of the frame
- 116 lower part of the frame
- 120 optical sensor system, camera
- 121 image
- 130 processing unit
- 131 splitter
- 132 visual or RGB image
- 133 infrared image
- 134 window state estimator
- 135 core neural network
- 136 output heads
- 137 output head for opening degree
- 138 output head for damage degree
- 139 output head for violation of work area
- 212 x-axis
- 214 y-axis
- 220 driver seat
- 222 head rest
- 224 exterior mirror
- 226 guiding rail
- 230 first straight line for the upper edge of the pane
- 232 second straight line for the lower part or edge of the frame 240 ground truth
242 free space
300 flow diagram illustrating a method for determining a current status of a window of a vehicle
302 operation of acquiring, via an optical sensor system, at least one image of an interior of a vehicle cabin, wherein at least a part of the window is visible in the at least one image
304 operation of determining, via a processing unit, at least one characteristic of a pane of the window from the at least one image
306 operation of determining, via the processing unit, the current status of the window based on the at least one characteristic of the pane
400 window status determination system
402 image capturing circuit
404 characteristics determination circuit
406 current status determination circuit
407 connection
500 computer system according to various embodiments
502 processor
504 memory
506 non-transitory data storage
508 connection

What is claimed is:

1. A computer implemented method for determining a current status of a window of a vehicle, the vehicle comprising an optical sensor system configured to acquire at least one image of an interior of a vehicle cabin, at least a part of the window visible in the at least one image, the method comprising:
   determining, via a processing unit, at least one characteristic of a pane of the window from the at least one image, and
   determining, via the processing unit, a current status of the window based on the at least one characteristic of the pane,
   wherein determining the current status of the window includes based on the at least one characteristic of the pane further comprises: applying a machine learning algorithm to the at least one image, and
   wherein:
      the optical sensor system is configured to capture an image in the visible spectral range and an infrared image,
      the current status of the window is determined by applying the machine learning algorithm to the image in the visible spectral range and to the infrared image,
      determining the at least one characteristic of the pane further comprises monitoring at least a predefined portion of an upper edge of the pane with respect to a frame of the window,
      monitoring at least the predefined portion of the upper edge of the pane further comprises determining a position of the predefined portion of the upper edge of the pane relative to a position of at least one of an upper part or a lower part of the frame,
      a first straight line is adapted to the predefined portion of upper edge of the pane,
      a second straight line is adapted to at least one of the upper part or the lower part of the frame, and
      the position of the upper edge of the pane is determined with respect to at least one of the upper part or the lower part of the frame based on a respective offset and a respective slope of the first and second straight lines.

2. A computer implemented method for determining a current status of a window of a vehicle, the vehicle comprising an optical sensor system configured to acquire at least one image of an interior of a vehicle cabin, at least a part of the window visible in the at least one image, the method comprising:
   determining, via a processing unit, at least one characteristic of a pane of the window from the at least one image, and
   determining, via the processing unit, a current status of the window based on the at least one characteristic of the pane,
   wherein determining the at least one characteristic of the pane further comprises:
      monitoring at least a predefined portion of an upper edge of the pane with respect to a frame of the window,
   wherein monitoring at least the predefined portion of the upper edge of the pane further comprises:
      determining a position of the predefined portion of the upper edge of the pane relative to a position of at least one of an upper part or a lower part of the frame, and
   wherein:
      a first straight line is adapted to the predefined portion of upper edge of the pane,
      a second straight line is adapted to at least one of the upper part or the lower part of the frame, and
      the position of the upper edge of the pane is determined with respect to at least one of the upper part or the lower part of the frame based on a respective offset and a respective slope of the first and second straight lines.

3. The method according to claim 2, wherein determining the at least one characteristic of the pane further comprises:
   monitoring at least a predefined portion of an upper edge of the pane with respect to a frame of the window.

4. The method according to claim 3, wherein the current status is indicative of at least one of a closed state, a partly open state, or a fully open state of the window.

5. The method according to claim 3, wherein:
   the at least one characteristic of the pane of the window includes a damage indicator which is determined based on the at least one image, and
   the current status further includes a damage degree of the window which is determined based on the damage indicator.

6. The method according to claim 3, wherein:
   a free space between an upper edge of the pane and an upper part of a frame of the window is monitored regarding a presence of a foreign object, the free space being a part of a predefined work area of the pane,
   the at least one characteristic includes the presence of the foreign object in the predefined work area,
   the current status further includes a flag for a violation of the predefined work area, and
   the flag is set if the foreign object is present in the predefined work area.

7. The method according to claim 3, wherein:
   the current status is indicative of at least one of a closed state, a partly open state, or a fully open state of the window,
   the at least one characteristic of the pane of the window includes a damage indicator which is determined based on the at least one image, the current status further includes a damage degree of the window which is determined based on the damage indicator, a free space between an upper edge of the pane and an upper part of a frame of the window is monitored regarding a presence of a foreign object, the free space being a part of a predefined work area of the pane, the at least one characteristic includes the presence of the foreign object in the predefined work area, the current status further includes a flag for a violation of the predefined work area, and the flag is set if the foreign object is present in the predefined work area.

8. The method according to claim 3, wherein monitoring at least the predefined portion of the upper edge of the pane further comprises:

determining a position of the predefined portion of the upper edge of the pane relative to a position of at least one of an upper part or a lower part of the frame.

9. The method according to claim 2, wherein the current status is indicative of at least one of a closed state, a partly open state, or a fully open state of the window.

10. The method according to claim 9, wherein the current status is further indicative of an opening degree of the window.

11. The method according to claim 2, wherein:

the at least one characteristic of the pane of the window includes a damage indicator which is determined based on the at least one image, and the current status further includes a damage degree of the window which is determined based on the damage indicator.

12. The method according to claim 11, wherein:

the damage indicator includes at least one of a predefined trace or a predefined pattern which is associated with a damage of the pane, and the image provided by the optical sensor system is analyzed by the processing unit in order to recognize the predefined trace or predefined pattern.

13. The method according to claim 2, wherein:

a free space between an upper edge of the pane and an upper part of a frame of the window is monitored regarding a presence of a foreign object, the free space being a part of a predefined work area of the pane, the at least one characteristic includes the presence of the foreign object in the predefined work area, the current status further includes a flag for a violation of the predefined work area, and the flag is set if the foreign object is present in the predefined work area.

14. The method according to claim 2, wherein the current status of the window is transferred to at least one of:

a further system of the vehicle, or a display being visible for a driver of the vehicle, in order to at least one of:

issue a warning message based on the current status of the window, or initiate a safety measure based on the current status of the window.

* * * * *